United States Patent
Cowlishaw et al.

(10) Patent No.: US 10,782,932 B2
(45) Date of Patent: *Sep. 22, 2020

(54) ROUND FOR REROUND MODE IN A DECIMAL FLOATING POINT INSTRUCTION

(71) Applicant: INTERNATIONAL BUSINESS MACHINES CORPORATION, Armonk, NY (US)

(72) Inventors: Michael F. Cowlishaw, Coventry (GB); Eric M. Schwarz, Gardiner, NY (US); Ronald M. Smith, Sr., Wappingers Falls, NY (US); Phil C. Yeh, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 28 days.

This patent is subject to a terminal disclaimer.

(21) Appl. No.: 16/550,257

(22) Filed: Aug. 25, 2019

(65) Prior Publication Data
US 2019/0377550 A1 Dec. 12, 2019

Related U.S. Application Data

(63) Continuation of application No. 16/185,028, filed on Nov. 9, 2018, now Pat. No. 10,423,388, which is a
(Continued)

(51) Int. Cl.
*G06F 7/499* (2006.01)
*G06F 9/30* (2018.01)
(Continued)

(52) U.S. Cl.
CPC .......... *G06F 7/49957* (2013.01); *G06F 7/386* (2013.01); *G06F 7/483* (2013.01);
(Continued)

(58) Field of Classification Search
None
See application file for complete search history.

(56) References Cited

U.S. PATENT DOCUMENTS 4,823,260 A 4/1989 Imel et al.
5,551,013 A 8/1996 Beausoleil et al.
(Continued)

OTHER PUBLICATIONS

Bernal et al, "Integer Representation of Decimal Numbers For Exact Computations", Journal of Research of the National Institute of Standards and Technology, vol. 111, No. 2, Mar.-Apr. 2006, pp. 79-88.
(Continued)

*Primary Examiner* — Michael D. Yaary

(57) ABSTRACT

A round-for-reround mode (preferably in a BID encoded Decimal format) of a floating point instruction prepares a result for later rounding to a variable number of digits by detecting that the least significant digit may be a 0, and if so changing it to 1 when the trailing digits are not all 0. A subsequent reround instruction is then able to round the result to any number of digits at least 2 fewer than the number of digits of the result. An optional embodiment saves a tag indicating the fact that the low order digit of the result is 0 or 5 if the trailing bits are non-zero in a tag field rather than modify the result. Another optional embodiment also saves a half-way-and-above indicator when the trailing digits represent a decimal with a most significant digit having a value of 5. An optional subsequent reround instruction is able to round the result to any number of digits fewer or equal to the number of digits of the result using the saved tags.

17 Claims, 8 Drawing Sheets

Related U.S. Application Data continuation of application No. 15/852,180, filed on Dec. 22, 2017, now Pat. No. 10,127,014, which is a continuation of application No. 15/470,692, filed on Mar. 27, 2017, now Pat. No. 9,851,946, which is a continuation of application No. 14/943,254, filed on Nov. 17, 2015, now Pat. No. 9,690,544, which is a continuation of application No. 13/848,885, filed on Mar. 22, 2013, now Pat. No. 9,201,846, which is a continuation of application No. 11/680,894, filed on Mar. 1, 2007, now Pat. No. 8,443,029.

(51) Int. Cl.
  *G06F 7/491* (2006.01)
  *G06F 7/483* (2006.01)
  *G06F 17/10* (2006.01)
  *G06F 7/38* (2006.01)

(52) U.S. Cl.
  CPC .......... *G06F 7/491* (2013.01); *G06F 7/49915* (2013.01); *G06F 7/49963* (2013.01); *G06F 7/49968* (2013.01); *G06F 7/49973* (2013.01); *G06F 7/49978* (2013.01); *G06F 7/49984* (2013.01); *G06F 9/30014* (2013.01); *G06F 17/10* (2013.01); *H05K 999/00* (2013.01); *H05K 999/99* (2013.01); *G06F 7/49947* (2013.01)

(56) References Cited

U.S. PATENT DOCUMENTS

| | | | |
|---|---|---|---|
| 5,574,873 A | 11/1996 | Davidian | |
| 5,696,711 A | 12/1997 | Makineni | |
| 5,748,516 A * | 5/1998 | Goddard | G06F 7/483 708/497 |
| 5,790,825 A | 8/1998 | Traut | |
| 6,009,261 A | 12/1999 | Scalzi et al. | |
| 6,044,392 A | 3/2000 | Anderson et al. | |
| 6,108,772 A | 8/2000 | Sharangpani | |
| 6,308,255 B1 | 10/2001 | Gorishek, IV et al. | |
| 6,423,260 B1 | 7/2002 | Chartoff et al. | |
| 6,463,582 B1 | 10/2002 | Lethin et al. | |
| 6,560,623 B1 | 5/2003 | Smith | |
| 6,785,701 B2 | 8/2004 | Park et al. | |
| 6,854,001 B2 | 2/2005 | Good et al. | |
| 6,978,289 B1 | 12/2005 | Matula et al. | |
| 7,035,891 B2 | 4/2006 | Makineni et al. | |
| 7,035,892 B2 | 4/2006 | Denk et al. | |
| 7,062,525 B1 | 6/2006 | Lin | |
| 7,069,288 B2 | 6/2006 | Steele, Jr. | |
| 8,443,029 B2 | 5/2013 | Cowlishaw et al. | |
| 9,201,846 B2 | 12/2015 | Cowlishaw et al. | |
| 9,690,544 B2 | 6/2017 | Cowlishaw et al. | |
| 9,851,946 B2 | 12/2017 | Cowlishaw et al. | |
| 2002/0198918 A1 | 12/2002 | Steele, Jr. | |
| 2003/0115236 A1 | 6/2003 | Naini et al. | |
| 2004/0158600 A1 | 8/2004 | Markstein et al. | |
| 2004/0254971 A1 | 12/2004 | Driker et al. | |
| 2004/0254973 A1 | 12/2004 | Tang et al. | |
| 2006/0047738 A1 | 3/2006 | Schwarz et al. | |
| 2006/0242213 A1 | 10/2006 | Wood | |
| 2006/0265443 A1 | 11/2006 | Cornia-Hasegan | |
| 2018/0121165 A1 | 5/2018 | Cowlishaw et al. | |
| 2019/0079730 A1 | 3/2019 | Cowlishaw et al. | |

OTHER PUBLICATIONS

IBM z/Architecture Preliminary Decimal Floating Point Architecture, Nov. 2006, SA23-2232-00; 4-1 through 1-2; 6-1 through 6-4; 9-1 through 9-2; 19-1 through 19-2; 20-1 through 20-42.

* cited by examiner

| vwxst | abcd | efgh | ijkm |
|-------|------|------|------|
| 0---- | 0pqr | 0stu | 0wxy |
| 100-- | 0pqr | 0stu | 100y |
| 101-- | 0pqr | 100u | 0sty |
| 110-- | 100r | 0stu | 0pqy |
| 11100 | 100r | 100u | 0pqy |
| 11101 | 100r | 0pqu | 100y |
| 11110 | 0pqr | 100u | 100y |
| 11111 | 100r | 100u | 100y |

FIG. 3 Prior Art

ROUND FOR REROUND MODE IN A DECIMAL FLOATING POINT INSTRUCTION

FIELD OF THE INVENTION

The present invention is related computer systems and, more particularly to rounding floating point coefficients to a selected precision.

BACKGROUND OF THE INVENTION

U.S. patent application Ser. No. 10/930,129 (Schwarz et al.) "Decimal Rounding Mode which Preserves Data Information For Further Rounding to Less Precision" filed Aug. 31, 2004 and incorporated herein by reference describes 1) using a new rounding mode called "round for reround" on the original arithmetic instruction in the hardware precision, and then 2) invoking an instruction which specifies a variable rounding precision and possibly explicitly sets the rounding mode which we have called the ReRound instruction. The precise result of the arithmetic operation is first truncated to the hardware format precision "p", forming an intermediate result. If only zeros are dropped during truncation, then the intermediate result is equal to the precise result, and this result is said to be "exact", otherwise, it is "inexact". When the intermediate result is inexact and its least significant digit is either zero or five, then that digit is incremented to one or six respectively forming the rounded result. Thus, when the least significant digit of a rounded result is zero or five the result could be construed to be exact or exactly halfway between two machine representations if it were later rounded to one less digit of precision. For all other values, it is obvious that the result is inexact and not halfway between two machine representations for later roundings to fewer than "p" digits of precision. A nice mathematical property of this rounding mode is that results stay ordered and in a hardware implementation it is guaranteed that the incrementation of the least significant digit does not cause a carry into the next digit of the result.

In the Schwarz application a first requirement is to create an instruction which rounds to a user specified precision which is variable, which we call the "ReRound" instruction. And the second requirement is that the original arithmetic operation in the higher precision somehow maintains information about the infinitely precise intermediate result. This information is used to prevent incorrect double rounding and enables the hardware to construct an equivalent operand, which when rounded to a smaller precision using the ReRound instruction, produces the same result as if rounding the original infinitely precise operand. Prior methods for maintaining this information about the infinitely precise result have included recording in a status word whether the rounded target is inexact and in a few cases some architectures have also provided a bit indicating whether it was rounded up. This allows rounding of a "p" digit result to a "p-1" or less digits of precision. One other method previously mentioned is to only round to only "((p/2)-1)" where "p" is the precision of the target of an arithmetic operation (i.e. 7, 16 or 34 digits depending on hardware format chosen). Choosing to limit the rounding capabilities to less than half the machine precision is severely limiting. And using the status word to maintain the additional information creates a bottleneck for performance.

The Schwarz application eliminates the performance bottleneck of updating and reading the floating-point status word of prior applications and provides the capability of secondary roundings up to "p-1" digits of precision where the first rounding was to "p" digits of precision. The mechanism for providing this information is to create a new rounding mode which maintains this information within the result of the first rounded result which was rounded to the hardware format precision. This rounding mode creates a result which will round equivalently to "p-1" digits or less of precision as the original infinitely precise result. By doing this, the extra information is contained completely within the operand and there is no bottleneck in using the floating-point status word. And given that the information is contained within the operand, multiple independent operations can be placed in between these two instructions (the original arithmetic instruction to hardware precision and the subsequent rerounding to lesser precision).

The Schwarz application provides a new rounding mode called "round for reround". The precise result of the arithmetic operation is first truncated to the hardware format precision "p", forming an intermediate result. If only zeros are dropped during truncation, then the intermediate result is equal to the precise result, and this result is said to be "exact", otherwise, it is "inexact". When the intermediate result is inexact and its least significant digit is either zero or five, then that digit is incremented to one or six respectively forming the rounded result. Thus, when the least significant digit of a rounded result is zero or five the result could be construed to be exact or exactly halfway between two machine representations if it were later rounded to one less digit of precision. For all other values, it is obvious that the result is inexact and not halfway between two machine representations for later roundings to fewer than "p" digits of precision. A nice mathematical property of this rounding mode is that results stay ordered and in a hardware implementation it is guaranteed that the incrementation of the least significant digit does not cause a carry into the next digit of the result.

An example of the problem is shown when one wishes to multiply two operands in a 16 digit hardware format but later round the answer to 15 digits in rounding mode where the operand is rounded to the nearest representable number in the target format and in case of a tie is rounded to the lower magnitude. One could also call this rounding mode round half down).

In the example, employing a decimal multiply intermediate product, say 1.23456789012344500111

If the decimal multiply were rounded toward zero the 16 digit result would be 1.234567890123445 and then applying an instruction to reround to 15 digits would yield 1.23456789012344 which is a wrong result.

U.S. Pat. No. 4,823,260 (to Imel et al.) "MIXED-PRECISION FLOATING POINT OPERATIONS FROM A SINGLE INSTRUCTION OPCODE" filed Nov. 12, 1987 and incorporated herein by reference provides for performing mixed precision calculations in the floating point unit of a microprocessor from a single instruction opcode. 80-bit floating-point registers) may be specified as the source or destination address of a floating-point instruction. When the address range of the destination indicates that a floating point register is addressed, the result of that operation is not rounded to the precision specified by the instruction, but is rounded to extended 80-bit precision and loaded into the floating point register. When the address range of the source indicates that an FP register is addressed, the data is loaded from the FP register in extended precision, regardless of the precision specified by the instruction. In this way, real and long-real operations can be made to use extended precision numbers without explicitly specifying that in the opcode.

The Intel iAPX 286/20 Numeric Data Processor (NDP) has a floating point instruction set that supports the IEEE Microprocessor Floating Point Standard P754. The NDP has eight 80-bit floating point registers which provide a capacity equivalent to forty 16-bit registers. Two 16-bit registers control and report the results of numeric instructions. A control word register defines the rounding, infinity, precision, and error-mask controls required by the IEEE standard. In order to accommodate extended-precision floating point calculations, the NDP supports 32-bit, 64-bit, and 80-bit real values. The 80-bit real values are used internally by the eight 80-bit floating point registers for extremely high precision calculations. To implement this arithmetic capability requires a separate opcode for each instruction which specifies a floating-point data type. This results in a number of separate opcodes in order to achieve all possible combinations of floating-point data types. Extra conversion instructions are necessary to convert and round the extended real result to the desired destination format with double rounding. It is desirable to reduce the number of floating point operations in order to simplify the programming and increase the performance of floating-point operations.

The Imel patent provides an apparatus for performing a number of kinds of mixed precision calculations in the floating point unit of a microprocessor utilizing a single instruction opcode.

U.S. Pat. No. 6,108,772 "METHOD AND APPARATUS FOR SUPPORTING MULTIPLE FLOATING POINT PROCESSING MODELS" filed Jun. 28, 1996 and incorporated herein by reference discloses a numerical processing method on a computer system in which an instruction having at least one operand and a type control is retrieved, and the operand is converted to a precision specified by the type control. The instruction is executed in the precision specified by the type control to obtain a result, and when the destination precision differs from the precision specified by the type control, the result is converted to the destination precision using a second instruction.

A method is needed to permit rounding decimal floating point (DFP) numbers to a variable precision that results in a precise result.

SUMMARY OF THE INVENTION

The present invention provides for preparing a Decimal Floating Point BID encoded result of an instruction execution for rounding to a variable precision value. An instruction employing the invention executes a round-for-reround mode that detects if the result formed from an intermediate result has a least significant bit value of 0 and that the trailing portion (to be truncated off) has a value greater than 1 and when those conditions are met, a flag is set when the result is exact. Two means are proposed. The first sets the low order bit of the result to 1 such that any subsequent reround to at least 2 fewer decimal digits can be performed because it is guaranteed that the least significant decimal digit is not 0 (however the least significant decimal digit might still be 5 exact or inexact so the reround cannot safely reround to 1 fewer digits).

In another embodiment, a test is performed in the round-for-reround mode for a least significant digit being 0 or 5 and the trailing digits being greater than 0 to set a first flag. If the value of the trailing digits is a half-way-and-above value setting a second flag but. The tag bits are saved in one of a plurality of registers associated with a FPR of a plurality of Floating Point Registers. In this case the result portion of the intermediate portion is not modified before storing it as a result because the needed information is saved in the tag fields. A subsequent DFP reround instruction uses these flag bits to reround the resulting operand to a variable number of digits less than or equal to the number of digits of the source operand.

It is therefore an object of the invention to execute a decimal floating point instruction (DFP round-for-reround instruction) configured to perform a decimal floating point operation, the decimal floating point instruction configured to utilize a round-for-reround mode, the executing step comprising the steps of producing an intermediate result of the executed decimal floating point operation, the intermediate result having a high order portion and a low order portion, the high order portion corresponding to a hardware format, the hardware format having a first number of digits of precision (decimal coefficient digits of precision) including a least significant digit. Then, rounding the high order portion according to the round-for-reround mode, wherein the rounding step comprises the step of, if the least significant bit of the high order portion is 0 and if the value of the low order portion is greater than 0, changing the least significant bit of said high order portion to 1 to form a to-be-stored high order portion (rounded-for-reround DFP number). If the least significant bit of the high order portion of the intermediate result produced in step 1) is 1, or if the value of the low order portion of said intermediate result produced in step 1) is 0, leaving the least significant digit of said high order portion unchanged to form said to-be-stored high order portion. Then storing the to-be-stored high order portion as a final result of the executed decimal floating point operation.

It is further an object of the invention to, subsequent to execution of the decimal floating point instruction (DFP round-for-reround instruction), executing a decimal (DFP) reround instruction, the decimal reround instruction configured to round a decimal floating point number to any of a plurality of rounding precisions, the step of executing the decimal reround instruction execution comprising the steps of fetching the stored final result of the executed decimal floating point (DFP) operation, the fetched final result having a first number of bits representing a first number of decimal digits. Then determining a decimal reround instruction specified rounding precision of the plurality of rounding precisions, wherein the specified rounding precision employs a second number of digits consisting of two or more fewer digits than the first number of digits. Then rounding the fetched final result to the second number of digits specified by the decimal reround interaction. And storing the rounded final result (rounded result) of the executed decimal floating point operation as a result of the decimal reround instruction.

The above as well as additional objectives, features, and advantages of the present invention will become apparent in the following written description.

BRIEF DESCRIPTION OF THE DRAWINGS

FIG. 3 is a table depicting the prior art DPD coding scheme;

DESCRIPTION OF THE PREFERRED EMBODIMENT

Figure 1:
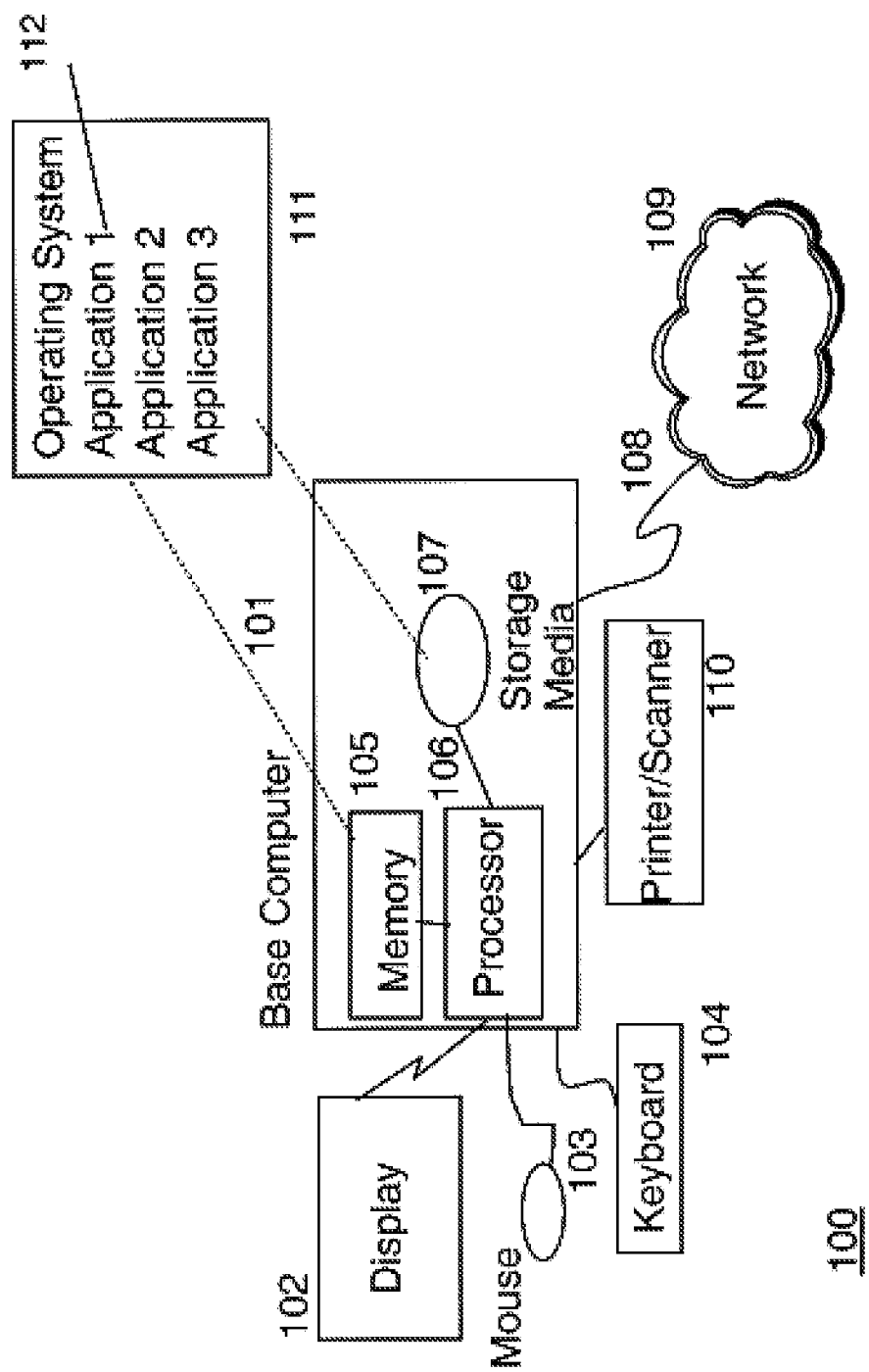
FIG. 1 is a diagram depicting components of an example prior art computer system.

FIG. 1 illustrates a representative workstation or server hardware system in which the present invention may be practiced. The system 100 of FIG. 1 comprises a representative computer system 101, such as a personal computer, a workstation or a server, including optional peripheral devices. The workstation 101 includes one or more processors 106 and a bus employed to connect and enable communication between the processor(s) 106 and the other components of the system 101 in accordance with known techniques. The bus connects the processor 106 to memory 105 and long-term storage 107 which can include a hard drive, diskette drive or tape drive for example. The system 101 might also include a user interface adapter, which connects the microprocessor 106 via the bus to one or more interface devices, such as a keyboard 104, mouse 103, a Printer/scanner 110 and/or other interface devices, which can be any user interface device, such as a touch sensitive screen, digitized entry pad, etc. The bus also connects a display device 102, such as an LCD screen or monitor, to the microprocessor 106 via a display adapter.

More particularly, machine instructions of the present invention can be used with a computer architecture with existing instruction formats. These computer architected instructions comprise computer software, stored in a computer storage medium, for producing the code running of the processor utilizing the computer software, and comprising the instruction code for use by a compiler or emulator/interpreter which is stored in a computer storage medium, and wherein the first part of the instruction code comprises an operation code which specified the operation to be performed and a second part which designates the operands for that participate.

The system 101 may communicate with other computers or networks of computers by way of a network adapter capable of communicating 108 with a network 109. Example network adapters are communications channels, token ring, Ethernet or modems. Alternatively, the workstation 101 may communicate using a wireless interface, such as a CDPD (cellular digital packet data) card. The workstation 101 may be associated with such other computers in a Local Area Network (LAN) or a Wide Area Network (WAN), or the workstation 101 can be a client in a client/server arrangement with another computer, etc. All of these configurations, as well as the appropriate communications hardware and software, are known in the art.

Figure 2:
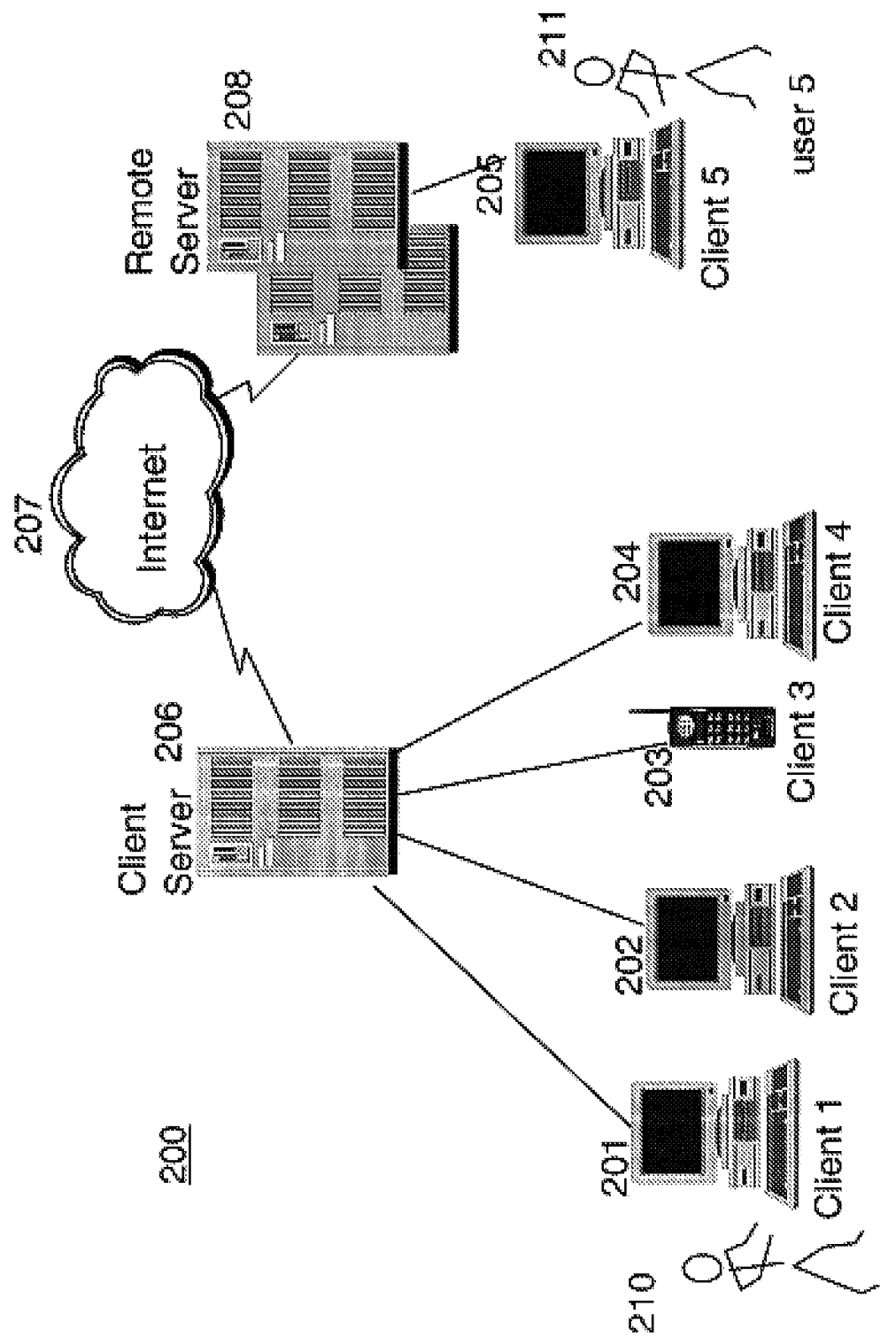
FIG. 2 depicts an example network of computer systems according to the prior art.

FIG. 2 illustrates a data processing network 200 in which the present invention may be practiced. The data processing network 200 may include a plurality of individual networks, such as a wireless network and a wired network, each of which may include a plurality of individual workstations 101 201 202 203 204. Additionally, as those skilled in the art will appreciate, one or more LANs may be included, where a LAN may comprise a plurality of intelligent workstations coupled to a host processor.

Still referring to FIG. 2, the networks may also include mainframe computers or servers, such as a gateway computer (client server 206) or application server (remote server 208 which may access a data repository and may also be accessed directly from a workstation 205). A gateway computer 206 serves as a point of entry into each network 207. A gateway is needed when connecting one networking protocol to another. The gateway 206 may be preferably coupled to another network (the Internet 207 for example) by means of a communications link. The gateway 206 may also be directly coupled to one or more workstations 101 201 202 203 204 using a communications link. The gateway computer may be implemented utilizing an IBM eServer zSeries® 900 Server available from IBM Corp.

Software programming code which embodies the present invention is typically accessed by the processor 106 of the system 101 from long-term storage media 107, such as a CD-ROM drive or hard drive. The software programming code may be embodied on any of a variety of known media for use with a data processing system, such as a diskette, hard drive, or CD-ROM. The code may be distributed on such media, or may be distributed to users 210 211 from the memory or storage of one computer system over a network to other computer systems for use by users of such other systems.

Alternatively, the programming code 111 may be embodied in the memory 105, and accessed by the processor 106 using the processor bus. Such programming code includes an operating system which controls the function and interaction of the various computer components and one or more application programs 112. Program code is normally paged from dense storage media 107 to high speed memory 105 where it is available for processing by the processor 106. The techniques and methods for embodying software programming code in memory, on physical media, and/or distributing software code via networks are well known and will not be further discussed herein.

The present invention may be practiced within a single computer or across a network of cooperating computers.

Floating point numbers are typically represented in a computer system using a sign, an exponent, and a significand. The significand represents the number of bits of precision of the number. The exponent defines the range of the number, and is bounded by the values Emax (maximum exponent) and Emin (minimum exponent). The sign represents the sign of the number, either positive or negative. Using these three fields, floating point numbers are represented in the form $$(-1)^s 2^E (b_0.b_1 b_2 b_3. b_{p-1})$$

where:
s=the sign bit, 0 or 1
E=the exponent, any integer between Emin and Emax, inclusive
bi=a significand bit, 0 or 1
p=number of significand bits (precision)
.=implied decimal point A floating point number has p bits of precision in the significand field, $b_0. b_1 b_2 b_3. b_{p-1}$, which represent the number's significant digits. (The term 'significand' is analogous to the term 'mantissa' used to describe floating-point numbers on some conventional computers). The exponent field, E, locates the binary point within the significant digits (and therefore determines the number's magnitude). The term 'exponent' is analogous to the term 'characteristic' used to describe floating-point numbers on some conventional computers. The decimal point is not explicitly stored in the number, although its position is implied. Also, the significand bit b0 to the left of the decimal point may be implied as well. A 1-bit sign field, s, indicates whether the number is positive or negative. Negative numbers differ from positive numbers only in the sign bits of their significands.

For example, the number −260.00 can be represented as: 1 00001000000001000000000000000000 where the sign bit is 1 (indicating a negative number), the exponent is 00001000 ($8_2$), and the significand is 1.00000100000000000000000, where the leading 1 and decimal point are implicit.

TABLE 1

|  | Single | Double | Extended |
| --- | --- | --- | --- |
| Total Format | 32 | 64 | 80 |
| Width p (bits of precision) | 23 | 53 | 64 |
| Exponent bits | 8 | 11 | 15 |
| Emax | +127 | +1023 | +16383 |
| Emin | −126 | −1022 | −16382 |
| Exponent Bias | +127 | +1023 | +16383 |

Table 1 describes the fields of each of three real-number formats; single, double, and extended.

The exponent determines a real number's magnitude. The exponent is typically stored in a biased form. A constant, called the bias, is added to the true exponent of the number to obtain a biased exponent. The bias is different for each real format. The bias is chosen so as to force the biased exponent to be a positive value. A number's true exponent can be determined simply by subtracting the bias value of its format from the exponent.

When a numeric value becomes very close to zero, normalized floating-point storage cannot be used to express the value accurately. A number R is said to be denormal when −2Emin<R. to accommodate denormal numbers, the processor can store and operate on real numbers that are not normalized, i.e., whose significands contain one or more leading zeros. Denormal numbers typically arise when the result of a calculation yields a value that is too small to represent in the destination format.

Denormal Values have the Following Properties:
The biased floating-point exponent is stored at its smallest value. For single precision numbers, this minimum exponent value is −126. For double precision, the minimum exponent value is −1022. For the extended precision format, the minimum exponent value is −16382.
For all formats, when the number is denormal the minimum exponent is encoded with a bit pattern of all zeros.
The integer bit of the significand (whether explicit or implicit) is zero.

Interpretation of the exponent for denormal numbers differs from the interpretation of the exponent encoding for normalized numbers. For denormalized numbers, the exponent is encoded with the bit pattern of all zeros. However, this pattern is interpreted by the processor to have a value which is the minimum exponent value for the format (which is −126 for single format, −1022 for double real format, and −16382 for the extended real format). Hence, interpreting such denormal numbers by merely adding the bias of the format to the exponent encoding of the denormal number will produce an exponent value that is off by one. Denormals and true zeros both have exponents encoded with all zeros, although the interpretation of these encodings differ.

Numeric Computation Rules:
To achieve consistent and reliable results from the computation, certain rules or conventions (relating to the operating precision and range of each computation) must be followed during numeric operations. Rules are defined for handling operands of mixed precision, and for the computation of intermediate values. IEEE standard 754-1985 allows for two important conventions for handling operands with mixed precisions, and for intermediate computations. These will be henceforth referred to as:
"Compute in Extended Precision"
"Compute in Destination Precision"

The detailed computation rules specified in the IEEE standard 754-1985 will not all be repeated here, and may be found in the official document. However, a short summary of the distinguishing characteristics is provided below.

Summary of the "Compute in Extended Precision" Convention

Under this convention, all intermediate values are computed to approximately infinite precision (commonly approximated by the extended precision format which must have at least 64 bits of precision) before entering into the final computation of the result. The result is then coerced to the destination format.

For example, consider the numerical operation:

$$A=B*C+D*E$$

where A, B, C, D, E are all defined to be double-precision values. Let I1=B*C, let I2=D*E, and let I3=I1+I2

In the above example, all variables B, C, D, and E are first promoted to the extended precision format (no information is lost in promoting a variable to a wider format). Intermediate values I1 and I2 are calculated by performing the multiplications for B*C as well as for D*E in extended precision, so that I1 and I2 contain 64 bits of precision. The sum of I1 and I2 is also computed in extended precision to generate I3. Finally I3 is coerced to the double precision format by a rounding and precision conversion operation.

This convention is used by the floating point units and math coprocessors for the x86 family of processors manufactured by INTEL® Corp. The advantage of this convention is that intermediate values are computed with additional precision and range, which enhances the precision, reliability and integrity of the final result. The enhanced range on intermediate values often eliminates overflows and underflows that could have occurred on the intermediate calculations but would not have been significant for the final result.

In an exemplary processor such as those manufactured by Intel Corp, the extended precision format contains 64 bits of precision, and the exponent range is 15 bits. The coercion of the intermediate value I3 from extended precision to the final result in the destination precision is performed by a store instruction, which also saves the final result to memory. This store instruction is complicated by the necessity to not only store the result to memory, but also convert to the destination precision, including rounding of the value and checking for overflow or underflow which may accompany the conversion, and possibly denormalizing the result to the destination format. The hardware for implementing the store instruction requires a rounding circuit, a range-checking and compression circuit, a denormalizer, as well as circuitry for actually transferring the value to memory. Thus considerable complexities must be incurred on the store path in order to deliver the benefits of computing in a wider precision.

Summary of the "Compute in Destination Precision" Convention:

Under this convention, which is followed by many commercial Reduced Instruction Set (RISC) processors, all intermediate values are computed in the precision of the destination variable, rather than being computed in a wider format.

For example, consider again the numerical operation:

$$A=B*C+D*E$$

where A, B, C, D, E are all defined to be double-precision values. Let I1=B*C, and let I2=D*E.

Using this convention, the intermediate results I1 and I2 are computed in double precision. The double-precision final result A is simply computed as I1+I2, without any additional rounding or conversion, because both intermediate values I1 and I2 are also double precision.

The advantage of this convention is that computations are typically faster and require less hardware to implement. Arithmetic involving 64 bit operands (extended) is typically slower than arithmetic involving 53 bit operands (double). Also, since intermediate values are computed in the final destination precision, no additional conversion and rounding operations must be executed to reach the destination precision, further improving the speed of the calculation.

The disadvantage of this method is the lost precision and range on intermediate values. This loss results in an accumulation of round off errors and the potential for additional overflows and underflows during intermediate calculations. Round off accumulation leads to a loss of integrity in the final result, and the overflows and underflows (when they occur) lead to reduced performance. Improvements needed Decimal floating point rounding to variable precision is useful for financial applications run on microprocessor based computer processing systems, and will be seen to be an improvement to the now standard IEEE 754 Floating Point. It can be proved that a system can round to "p" digits of precision a result that was previously rounded to "2p+2" digits of precision without causing double rounding errors. The current IEEE 754 binary floating point standard defines the significands of single, double, and a proposed quad word format such that this criteria is met (24, 53, and 113 bits in each format). Each format is greater than a little over twice the width of the next smaller precision. There has been developed a current IEEE754 revision developed by a committee which has agreed on decimal floating-point formats of 7, 16, and 34 digits which also satisfy this requirement. When we considered this development we wondered how can a computer system be developed where a user can run applications which round to 10 digits accurately, for example, if the original arithmetic operation were rounded to 16 digits. Such an application would now meet the revised requirement, one which does not meet this criteria.

The problem is to perform the arithmetic operation and subsequent rounding as if only one rounding were performed on an infinitely precise intermediate result. Prior art comprised maintaining the intermediate result to infinite precision and performing rounding to the target precision on it. This proved to be prohibitive in terms of hardware to maintain the intermediate result or slow, and there could be very little separation of the arithmetic operation and the rounding step. Another possible method is to use flag bits in the floating-point status word that indicated inexactness and truncating the arithmetic operation followed by a special instruction which looked at the flag bit. This would require no separation of the arithmetic operation from the rounding instruction and required the resetting of the inexact flag which gets set by all arithmetic instructions. The Schwarz prior art allowed separation of the arithmetic operation from the shorter precision rounding operation without using a bottlenecked register like the floating-point status word. Instead the result of the arithmetic operation in the register file was rounded to make equivalent representation that rounded equivalent to the infinite precise result.

The Schwarz method is useful for DPD format which is a BCD like format, but it is not as easy to implement if the format is the INTEL® BID format. Incrementing a result with a 0 or 5 in the least significant digit may result in propagating a carry the whole length of the integer coefficient. Take for instance the number 16777215 base 10 is equal FFFFFF base 16 and when incremented will propagate its whole length. So, in an integer format it is possible that the prior art method may be used but it causes an expense in the rounding requiring a full length incrementation.

For the BID format, to eliminate the need for full propagation of the carry, a different rounding mode is proposed for decimal integer format. The new rounding mode consists of logically ORing a signal indicating the inexactness of the intermediate result with the least significant bit. Though with this rounding mode, rounding is supported efficiently to P−2 digits or less instead of P−1. This new rounding effectively helps perturb a least significant zero digit but does not perturb a least significant digit of 5 in the coefficient, therefore one less digit can be rounded to tell whether there is an exact half way case between two representations. This new rounding mode can be coupled with a ReRound instruction (as proposed in the Schwarz application) which can subsequently round the result of the arithmetic operation to the desired precision as long as it is 2 digits or more less than the hardware precision.

According to the IEEE 754R Floating Point standard DPD format, a set of 3 decimal digits d0:d2 are encoded into a 10 bit format consisting of bits b0:b9. When the value of all 3 decimal digits is less than 8, the decimal digits are encoded in binary form wherein d0 is encoded in b0:2, d1 is encoded in b3:b5 and d2 is encoded in b7-b9. b6 is set to 0 to indicate that all 3 digits are less than 8 and therefore, fit into the 3 bit binary forms. When a decimal digit is greater than 7, b6 is set to 1 and various other binary bits (bx) indicate that the corresponding encoding represents the decimal digit values greater than 7. In all cases, b9 is the least significant bit of the third decimal digit encoding. Thus, by setting b9 to 1, it is assured that the value of each corresponding value of the decimal digit is greater than 0. Furthermore, it is assured that any set of 3 decimal representations having a 5 followed by one or more 0's, the set is greater than 50 or 500. For the case where the least significant decimal digit is 5 (wherein b6 is 0), one might set b8 (of b7:b9) to 1 to assure that the resulting decimal digit is greater than 5.

In the IEEE 754R Floating Point standard, Binary Integer Decimal format abbreviated by BID is a format which represents the coefficient as a binary integer rather than using a format based on Binary Coded Decimal (BCD). For 64 bit decimal format with BID encoding, there is a 1 bit sign, 5 bit combination field, an 8 bit exponent continuation field, and a 50 bit coefficient continuation field similar to DPD encoding. There two differences between the BID and DPD encodings: 1) the encoding of the coefficient, and 2) the ordering of the combination and exponent continuation fields which is not detailed. The encoding of the coefficient for BID is a binary integer representation of the 4 coefficient bits extracted from the 5 bit combination field concatenated with the 50 bit coefficient continuation field for a total of 54 bits. Any value of the 54 coefficient bits greater than or equal to $10^{16}$ is treated as a value of zero. DPD encoding of the coefficient continuation field is a compressed BCD format which takes 3 BCD which would normally require 12 bits to represent and encodes them into 10 bits. BID encoding of the coefficient is in binary and DPD encodes the coefficient in a compressed BCD format. Binary is efficient for high-order arithmetic operations while DPD is efficient for extracting digits and converting to and from BCD databases.

According to IBM principles of operation document "Preliminary Decimal-Floating-Point Architecture" SA23-2232-00 published November 2006 and incorporated herein by reference, a coefficient continuation field of the decimal floating-point data format is encoded using Densely Packed Decimal (DPD). DPD encoding is a compression technique which supports the representation of decimal integers of arbitrary length. Translation operates on three Binary Coded Decimal (BCD) digits at a time compressing the 12 bits into 10 bits with an algorithm that can be applied or reversed using simple Boolean operations. In the following examples, a 3-digit BCD number is represented as (abcd)(efgh)(ijkm), a 10-bit DPD number is represented as (pqr)(stu)(v)(wxy), and the Boolean operations, & (AND), | (OR), and ¬ (NOT) are used.

BCD-to-DPD Translation

The translation from a 3-digit BCD number to a 10-bit DPD can be performed through the following Boolean operations.

$p = (a\&f\&i) | (a\&j) | b$ $q = (a\&g\&i) | (a\&k) | c$ $r = d$ $s = (\neg a\&e\&j) | (f\&\neg i) | (\neg a\&f) | (e\&i)$ $t = (\neg a\&e\&k) | (a\&i) | g$ $u = h$ $v = a | e | i$ $w = (\neg e\&j) | (e\&i) | a$ $x = (\neg a\&k) | (a\&i) | e$ $y = m$ DPD-to-BCD Translation The translation from a 10-bit DPD to a 3-digit BCD number can be performed through the following Boolean operations.

$a = (\neg s\&v\&w) | (t\&v\&w\&x) | (v\&w\&\neg x)$ $b = (p\&s\&x) | (p\&\neg w) | (p\&\neg v)$ $c = (q\&s\&x) | (q\&\neg w) | (q\&\neg v)$ $d = r$ $e = (t\&v\&\neg w\&x) | (s\&v\&w\&x) | (\neg t\&v\&x)$ $f = (p\&t\&v\&w\&x) | (s\&\neg x) | (s\&\neg v)$ $g = (q\&t\&w) | (t\&\neg x) | (t\&\neg v)$ $h = u$ $i = (t\&v\&w\&x) | (s\&v\&w\&x) | (v\&\neg w\&\neg x)$ $j = (p\&\neg s\&\neg t\&\neg w) | (s\&v\&\neg w\&x) | (p\&w\&\neg x) | (\neg v\&w)$ $k = (q\&\neg s\&\neg t\&v\&w) | (q\&v\&w\&\neg x) | (t\&v\&\neg w\&x) | (\neg v\&x)$ $m = y$ Alternatively, the Table shown in FIG. 3 can be used to perform the translation. A combination of five bits in the DPD encoding (leftmost column) vwxst are used to specify a translation to the 3-digit BCD encoding. Dashes (-) in the table are don't cares, and can be either one or zero.

Thus, in the DPD format, the least significant bit y of the DPD format is the same as the least significant bit m of the BCD digit that formed the DPD digit. Therefore, if the least significant digit of a BCD number is 0000, the least significant bit of the DPD encoding m is 0. This provides a useful characteristic for the present invention. If a DPD format operation is performed such as multiply, an intermediate result is produced. The intermediate result having a high order portion that conforms to a hardware format, and a low order portion. When the result is rounded, only the high order portion is saved. If the least significant decimal digit D (represented as a BCD digit) of the high order portion is 0, it will be necessary to know whether the value V of the low order portion was 0. If V was exactly 0, the high order portion is said to be exact. If the value V of the low order portion is not 0, the high order portion is inexact since one can't tell from the high order portion alone whether the least significant digit exactly represents the value that would have included the low order portion or not. The present invention, in a round-for-reround mode of operation, determines if the value V of the low order portion is not zero and if the low order bit p of the least significant BCD digit D in either BCD or DPD format of the high order portion is 0. If both are true, the low order bit p is changed to p'=1 to indicate that the least significant digit is not 0. This indicator, permits later rounding to D−2 digits or less. Rounding to D−1 digits would further require an exact/inexact indicator for a least significant digit of 5 which is not necessary for the rounding to D−2 or less.

In the case of a BID encoding, the coefficient is coded as a binary integer. Thus it would be very difficult to provide round for reround to the D−1 digit since in a binary integer, the whole integer would have to be analyzed to determine of the least significant digit D of the high order portion was 5. However in the BID encoding the least significant bit is directly indicative of if the least significant digit D it represents any even value including a decimal 0. Thus, in BID format the mechanism of setting the least significant bit p of the high order portion to a 1 when the both the least significant bit of the high order portion was 0 and the low order portion was not 0 provides a resultant least significant digit D' that only has a decimal value of 0 when it is exactly 0. This permits later rerounding to D−2 digits or less.

In an embodiment, the high order portion is pre-rounded according to a pre-round mode, wherein the pre-rounding mode comprises any one of round toward 0, round away from 0, round toward +infinity, round toward −infinity, round to nearest with ties to even, round to nearest with ties toward 0 and round to nearest with ties away from 0.

The present invention provides a round-for-reround mode for BID encoding by detecting that the encoded least significant bit p is 0 of the most significant portion of the intermediate result and testing that bits p+1 to n of the least significant portion are not all 0's. When this is the case, the p bit is changed to p'=1 indicating the coefficient is non-exact in the case where the least significant decimal digit of the intermediate result represented by the BID encoding was 0 since the change of p to p' changes the corresponding least significant digit to a decimal 1.

In one embodiment, the round-for-reround operation is performed after an additional step of pre-rounding to the hardware precision having D decimal digits using a specified pre-rounding mode.

A second alternate to the proposed invention is to maintain a register file with additional tag bits. It is common in both PowerPC from IBM corp. and INTEL implementations to maintain a bit(s) of additional information in storage associated with Floating Point Registers but this information has been limited to special number detection (exponent all zero or all ones, fraction all zero or all ones, NaN, Infinity, Zero, or even the implicit integer coefficient bit). In an embodiment of the present invention, 1 or 2 additional bits (pF tags) of information are maintained consisting of preferably an inexact bit e and an indicator g of whether a guard digit would be equal to 5 or more. The inexact bit does not include the guard digit half or more if present. The arithmetic operation is rounded to zero (truncation) to D digits and the D digits are written to the register file with the additional 1 or 2 tag bits. With 2 tag bits a subsequent Reround instruction could be designed to accurately round to any rounding mode up to D digits. With 1 tag bit (the inexact tag) the subsequent Reround instruction could be designed to accurately round to any rounding mode to D−1 digits, since a prior result cannot be determined to be exactly halfway between two representations. Note that 1 tag bit will accurately round directionally (to plus or minus infinity) to D digits.

The present invention includes the concept of:
1) a new rounding mode which logically ORs the sticky bit (representing the value of the least significant portion was greater than 0) to the least significant bit of coefficient coupled with a Reround instruction.
2) maintaining 1 inexact tag bit per FPR on arithmetic operations coupled with a Reround instruction utilizing the tag bit. The tag bit would preferably be saved in a register associated with the Floating Point Register (FPR) that stores the resulting decimal floating point number. Each FPR of the plurality of FPRs would have an associated tag register.
3) maintaining 2 tag bits comprising a guard halfway or above bit, and an inexact bit excluding halfway indication. The tag bits would preferably be saved in a register associated with the Floating Point Register (FPR) that stores the resulting decimal floating point number. Each FPR of the plurality of FPRs would have an associated tag register.

All of 1) through 3) are systems to achieve the equivalent of 1 rounding error even though the rounding is first performed to D digits on an arithmetic operation and then is subsequently, but possibly separated in time to allow out of order execution, rounded to a target variable precision which is less than or equal to D digits. These systems are very important in Decimal Floating-Point Arithmetic to avoid designing the complexity into every arithmetic instruction to force it to round to variable precision.

The present invention can be applied to other floating point formats, including but not limited to Hexadecimal, Binary or packed decimal.

Figure 4:
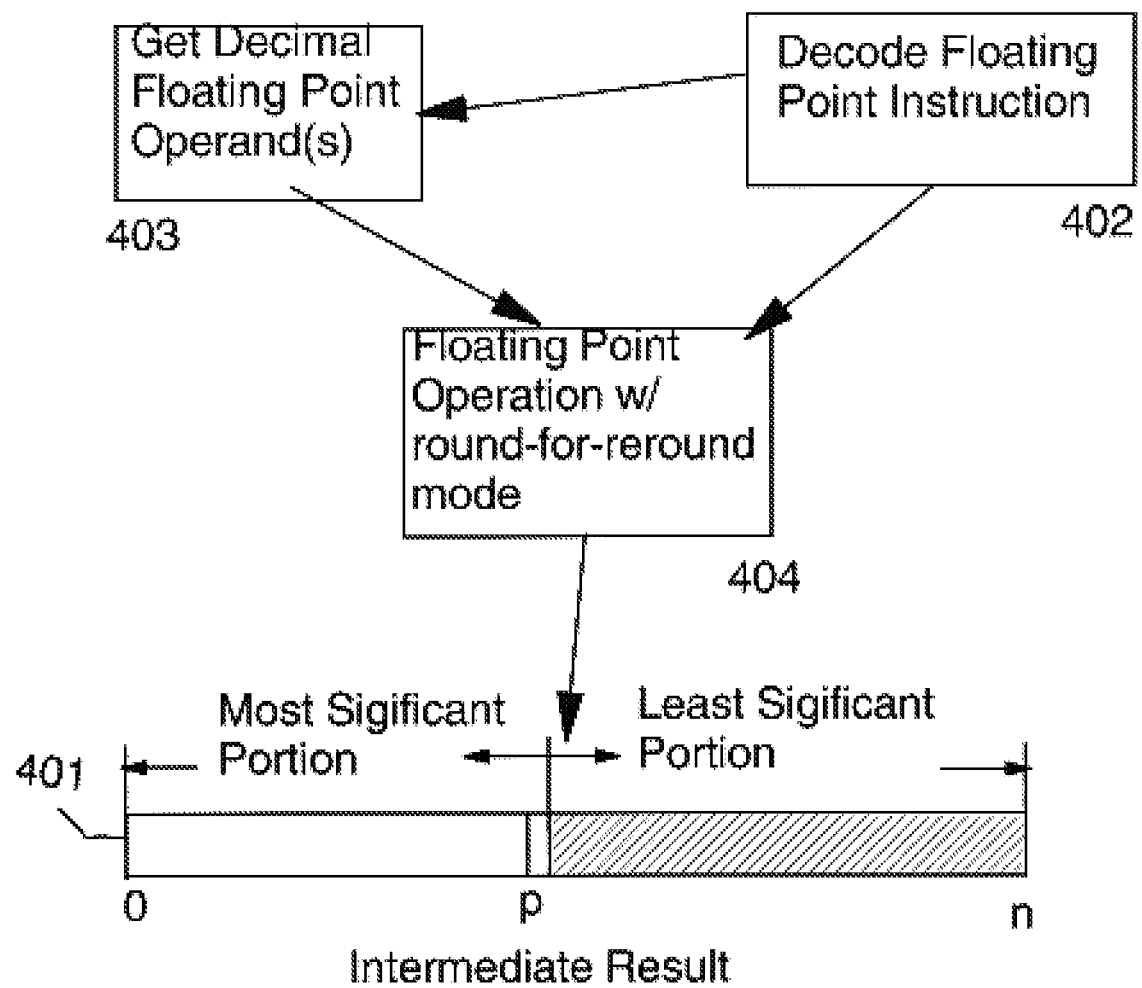
FIG. 4 is a diagram representing operation of an example round-for-reround instruction.

Referring to FIG. 4, in an embodiment, a Decimal Floating Point instruction (DFP round-for-reround instruction) is fetched and executed in a machine implementing a plurality of floating point registers. The instruction includes an opcode field and register fields for locating (DFP) operands. The instruction is decoded 402 and the location of operands is determined. Also, the operation is to be performed on the operands, what rounding mode (round-for-reround mode) to use and where to store the result of the operation is also determined by any means known in the art. The execution unit fetches the operands 403 and performs the instruction specified operation 404 on the operands 403, the operation in one embodiment is any one of a Multiply, a fused Multiply-and-Add, a Divide, a Convert to BCD, a Convert from BCD, an Add or a Subtract. The format of the coefficient of the operand is preferable BID but may also be any of DPD, binary, hexadecimal, BCD and the like. As a result of the operation, an intermediate result 401 is formed having n (coefficient) bits representing a decimal coefficient. The intermediate result 401 has a most significant portion of p bits, where the p-th bit is the least significant bit of the most significant portion. The intermediate result 401 further comprising a least significant portion (bits (p+1)–n) which will be discarded (to-be-discarded low order portion).

Figure 5:
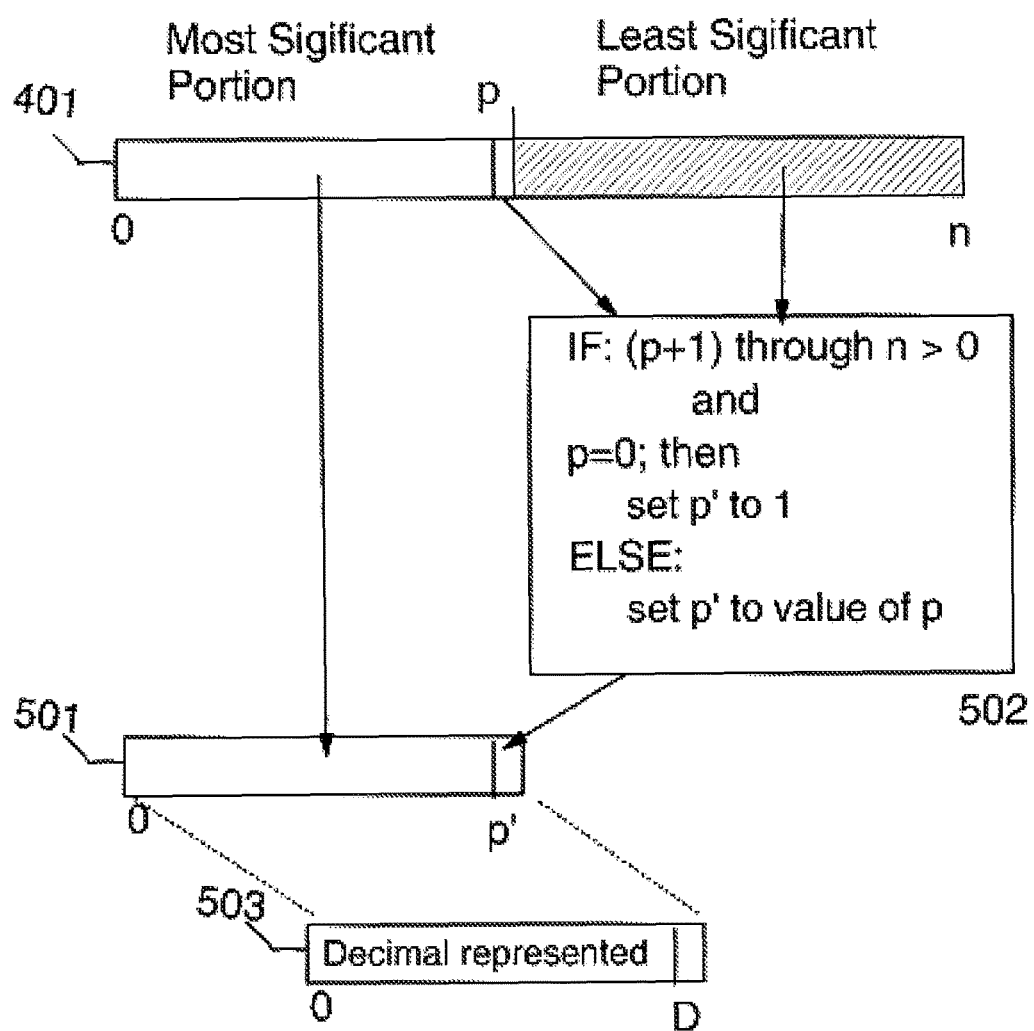
FIG. 5 depicts an example execution using the round-for-reround mode.

In one embodiment referring to FIG. 5, the round-for-reround mode forms a to-be-stored result (rounded-for-reround number) 501 consisting of the Most Significant Portion of the intermediate result (high order portion). The to-be-stored result 501 is an encoded value of a decimal result 503 having D decimal digits. The to-be-stored result comprises the value of bit p as a p' bit except that if 502 the value of the least significant portion was greater than 0 the p' bit is set to 1.

Figure 6:
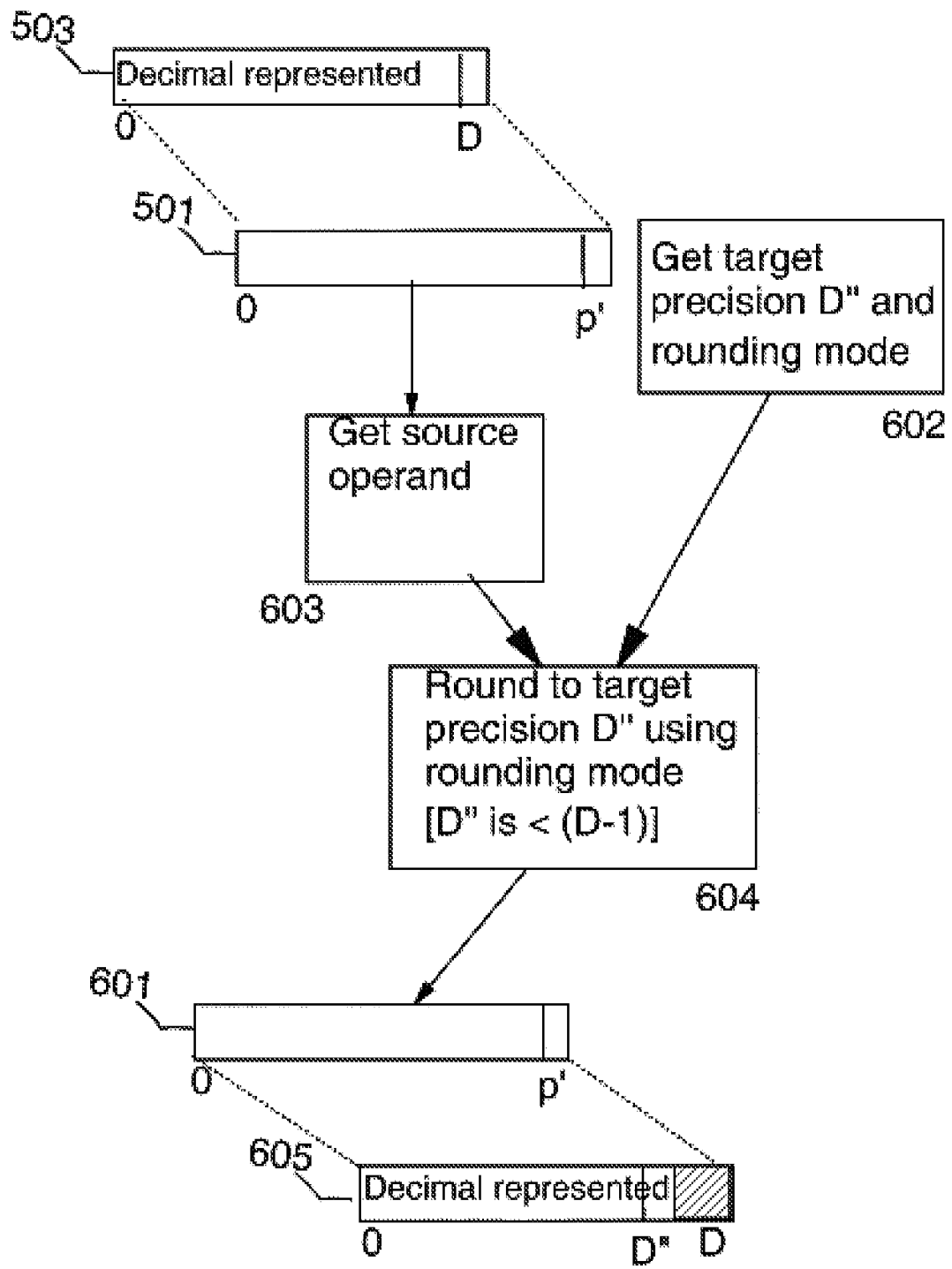
FIG. 6 depicts execution of a reround instruction.

Referring to FIG. 6, an example embodiment of a Decimal reround instruction operation is shown. The instruction comprises an opcode, for determining a target precision for performing the reround operation and a register field for locating a storage location for storing the result. Preferably the storage location is a Floating Point Register of a plurality of Floating Point Registers. The instruction is fetched and decoded to determine that it is a reround instruction. The target precision D" is obtained 602 which is the precision that will be applied to the source operand (for Decimal Floating Point, D is a number of Decimal coefficient digits 503 corresponding to the p' bit encoded value 501 of the operand. The source operand 501 (DFP number) is fetched 603, the source operand 501 being the to-be-stored result (rounded-for-reround number) stored by a previously executed Decimal instruction having the round-for-reround mode (DFP round-for-reround instruction). The source operand is then rounded to the precision D" (where D" is less than D) specified using a specified rounding mode where the number of bits of the encoded result is the encoded value of the decimal result 605 having D" digits. This embodiment of the reround instruction applied to a BID or DPD form of Decimal Floating Point number, must reround the source operand to a decimal precision D" having at least 2 less decimal digits than the source operand D since there is no indication that the least significant digit is a 5 or not. Since the exact/inexact information is encoded in the operand, intervening instructions not affecting the operand do not affect the use of the subsequent reround instruction.

Figure 7:
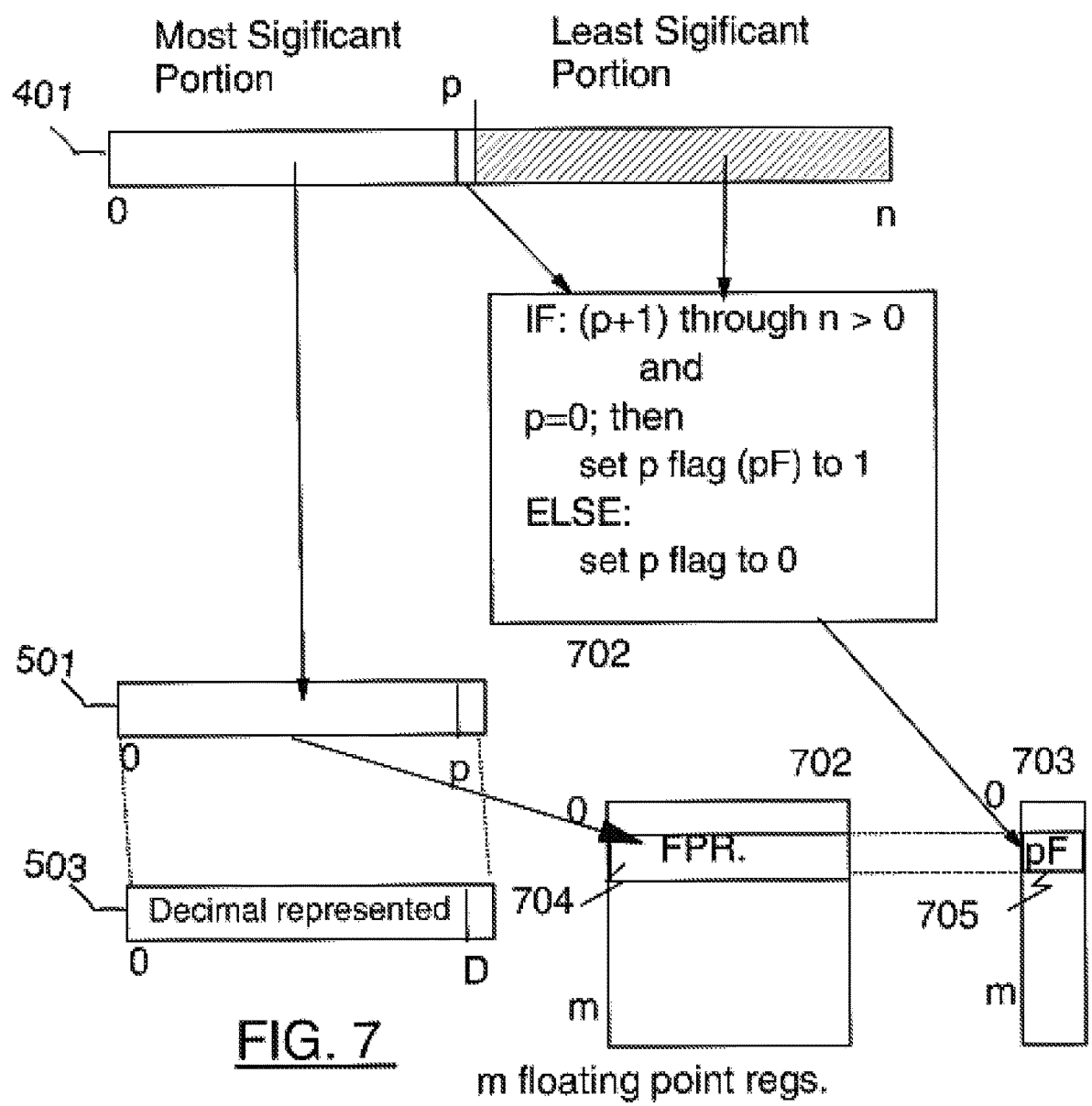
FIG. 7 depicts an embodiment of a round-for-reround instruction employing Floating Point Register tags (pF)

In another embodiment, referring to FIG. 7, the intermediate result of the Decimal Instruction is tested as before 502. However, instead of modifying the least significant digit of the to-be-stored result, a flag (pF) is set in a flag register 705 (of a plurality m of flag registers 703) associated with the floating point register 704 storing the result 501. In the embodiment, there is a flag register 705 associated with each FPR 704 of the plurality m of FPRs 702. In one embodiment, the flag when set indicates that the corresponding result low order bit was 0 and the trailing bits were not all 0's. In another implementation, the flag when set indicates that the low order digit of the result was 0 or 5 having trailing bits all 0's. In another implementation, an additional flag bit indicates if the trailing digits consisted of 5 as the most significant digit indicating a halfway-and-above trailer value.

Figure 8:
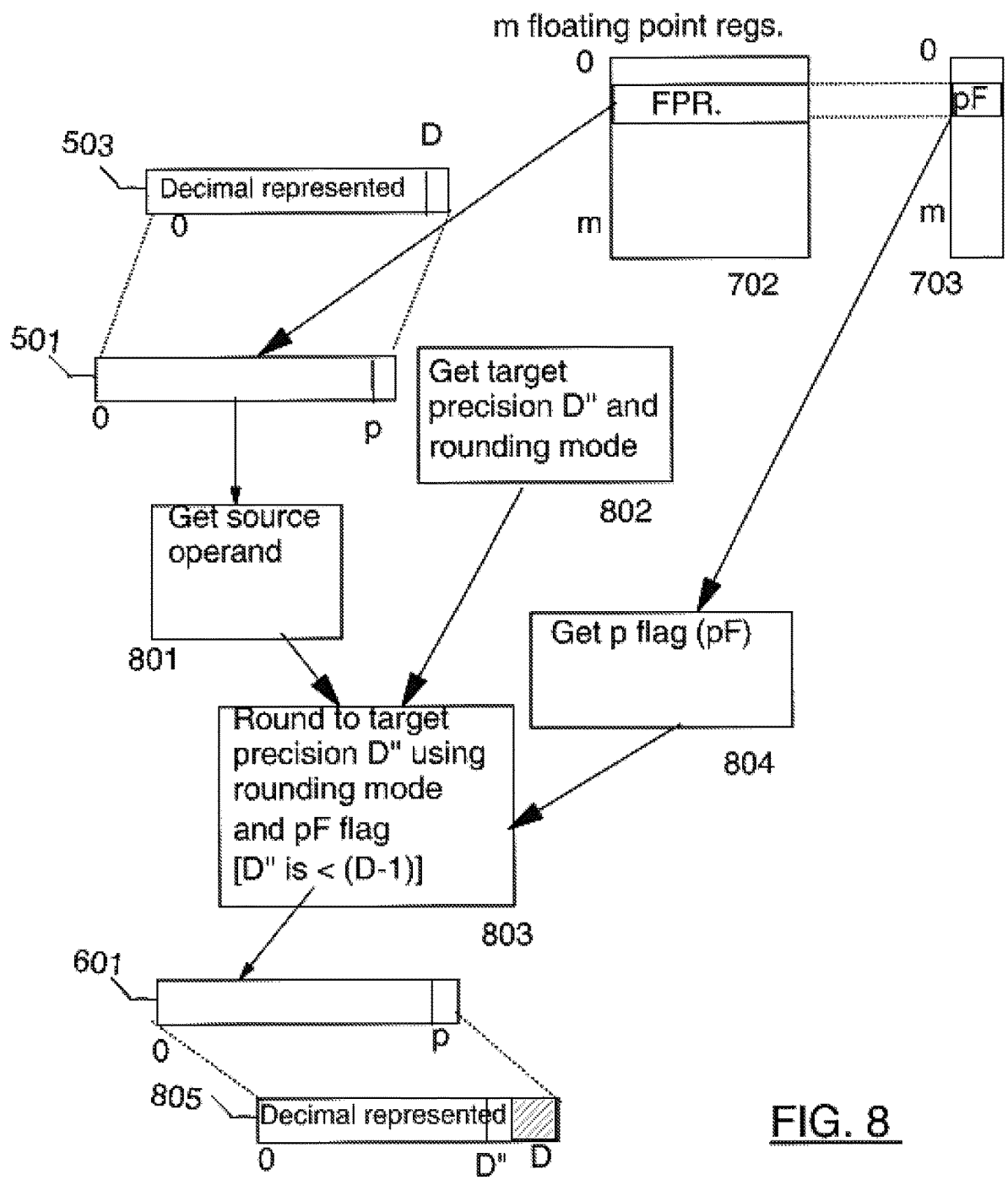
FIG. 8 depicts execution of a reround instruction using the pF tags.

Referring to FIG. 8, a reround instruction gets a target precision 802 D" and a rounding mode to be used and gets 801 the source operand 501 previously stored. The reround instruction gets 804 the pF flag. The reround instruction rounds 803 the source operand 501 to the precision D" according to the obtained 802 rounding mode. The result 601 encoded decimal 805 is saved preferably in a Floating Point Register. This embodiment of the reround instruction applied to a BID or DPD form of Decimal Floating Point (DFP) number, can reround the source operand to a decimal precision (decimal coefficient precision) having 1 or more fewer decimal digits than the source operand (if the pF flag indicates the least significant digit of the source operand is 0 or 5 and the least significant portion of the intermediate result was greater than 0).

We have shown conceptually how to implement what we have in a preferred embodiment implemented in a computer which can effectively be used in a commercial implementation of computer architected decimal instruction format the instructions are used by programmers, usually today "C" programmers. These instruction formats stored in the storage medium may be executed natively in a Z/Architecture IBM Server, or alternatively in machines executing other architectures. They can be emulated in the existing and in future IBM mainframe servers and on other machines of IBM (e.g. pSeries Servers and xSeries Servers). They can be executed in machines running Linux on a wide variety of machines using hardware manufactured by IBM, Intel, AMD, Sun Microsystems and others. Besides execution on that hardware under a Z/Architecture, Linux can be used as well as machines which use emulation by Hercules, UMX, FXI or Platform Solutions, where generally execution is in an emulation mode. In emulation mode the specific instruction being emulated is decoded, and a subroutine built to implement the individual instruction, as in a "C" subroutine or driver, or some other method of providing a driver for the specific hardware as is within the skill of those in the art after understanding the description of the preferred embodiment. Various software and hardware emulation patents including, but not limited to U.S. Pat. No. 5,551,013 for a "Multiprocessor for hardware emulation" of Beausoleil et al., and U.S. Pat. No. 6,009,261: Preprocessing of stored target routines for emulating incompatible instructions on a target processor" of Scalzi et al; and U.S. Pat. No. 5,574,873: Decoding guest instruction to directly access emulation routines that emulate the guest instructions, of Davidian et al; U.S. Pat. No. 6,308,255: Symmetrical multiprocessing bus and chipset used for coprocessor support allowing non-native code to run in a system, of Gorishek et al; and U.S. Pat. No. 6,463,582: Dynamic optimizing object code translator for architecture emulation and dynamic optimizing object code translation method of Lethin et al; and U.S. Pat. No. 5,790,825: Method for emulating guest instructions on a host computer through dynamic recompilation of host instructions of Eric Traut; and many others, illustrate the a variety of known ways to achieve emulation of an instruction format architected for a different machine for a target machine available to those skilled in the art, as well as those commercial software techniques used by those referenced above.

These Decimal instructions are executed in hardware by a processor or by emulation of said instruction set by software executing on a computer having a different native instruction set.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A computer implemented method for rounding a Decimal Floating Point (DFP) number to a lesser precision in a computer processor, the method comprising:
 a) executing, by the computer processor, a DFP round-for-reround instruction in a round-for-reround mode, wherein the DFP round-for-reround instruction is configured to perform a DFP operation on a DFP operand, wherein the DFP operand comprises a first number of decimal coefficient digits of precision, wherein the executing the DFP round-for-reround instruction comprises:
 forming, by the computer processor, an intermediate result having a second number of decimal coefficient digits of precision, wherein the second number of decimal coefficient digits of precision is greater than the first number of decimal coefficient digits of precision;
 creating from the intermediate result, a rounded-for-reround DFP number having a third number of decimal coefficient digits of precision and a least significant decimal digit, wherein the third number of decimal coefficient digits of precision is less than-or equal to the first number of decimal coefficient digits of precision, wherein based on the least significant decimal digit of the rounded-for-reround DFP number consisting of any one of a 0 and a 5, only the least significant digit being 0 indicates the rounded-for-reround DFP number is exact; and
 storing in computer processor storage, by the computer processor, the rounded-for-reround number as a final result of the executed DFP operation.

2. The computer implemented method according to claim 1, further comprising
 b) subsequent to executing the DFP round-for-reround instruction, executing, by the computer processor, a DFP reround instruction, wherein the executing comprises:
 rounding, by the computer processor, the rounded-for-reround DFP number to produce a rounded result, wherein the rounded result represents a DFP number having at least 2 fewer decimal coefficient digits of precision than the third number of decimal coefficient digits of precision; and
 storing in computer processor storage, by the computer processor, the rounded result as a result of the execution of the DFP reround instruction.

3. The computer implemented method according to claim 2, wherein the a) executing, by a computer processor, the DFP round-for-reround instruction further comprises:
 fetching from computer processor storage, by the computer processor, the DFP operand comprising a fourth number of coefficient bits representing a first decimal number, wherein the first decimal number has the first number of decimal coefficient digits of precision;
 performing, in the round-for-reround mode, by the computer processor, the DFP operation on the DFP operand to form the intermediate result, wherein the intermediate result consists of a high order portion and a to-be-discarded low order portion, wherein the high order portion comprises a fifth number of coefficient bits representing a second decimal number, the second decimal number having a least significant decimal digit, the to-be-discarded low order portion having a sixth number of coefficient bits;

based on the to-be-discarded low order portion representing a greater-than-0 decimal value, causing the least significant decimal digit to not have a 0 value by setting the least significant bit of the high order portion to 1; and wherein the b) executing, by the computer processor, the DFP reround instruction further comprises:

fetching from computer processor storage, by the computer processor, the stored rounded-for-reround number of the executed DFP operation, wherein the fetched rounded-for-reround number comprises the fifth number of bits representing the second number of decimal coefficient digits;

determining a DFP reround instruction specified rounding precision, wherein the DFP reround instruction specified rounding precision consists of at least 2 fewer decimal coefficient digits than the first number of decimal coefficient digits;

rounding, by the computer processor, the fetched rounded-for-reround number to a rounded result, wherein the rounded result represents a decimal number having the at least 2 fewer decimal coefficient digits of precision than the third number of decimal coefficient digits of precision.

4. The computer implemented method according to claim 2, further comprising:

executing in emulation mode, by the computer processor, one or more of any one of the DFP round-for-reround instruction and the DFP reround instruction using subroutines configured to implement the respective instructions.

5. The computer implemented method according to claim 2, wherein operands of the DFP operation comprise encoded forms of decimal coefficients, wherein decimal coefficients of encoded forms consist of any one of a binary integer decimal (BID) encoding and a densely packed decimal (DPD) encoding.

6. The computer implemented method according to claim 2, wherein the executed DFP operation consists of any one of a Multiply, a fused Multiply-and-Add, a Divide, a Convert to BCD, a Convert from BCD, an Add and a Subtract.

7. A computer system for rounding a decimal floating point number to a lesser precision, the computer system comprising:

a computer processor comprising:

an instruction fetching unit for fetching instructions to be executed;

a floating point arithmetic unit for executing floating point operations for executing fetched floating point instructions; and an operand storage in communication with said floating point arithmetic unit; and a memory communicatively coupled to said computer processor, the computer system configured to perform a method comprising:

a) executing, by the computer processor, a DFP round-for-reround instruction in a round-for-reround mode, wherein the DFP round-for-reround instruction is configured to perform a DFP operation on a DFP operand, wherein the DFP operand comprises a first number of decimal coefficient digits of precision, wherein the executing the DFP round-for-reround instruction comprises:

forming, by the computer processor, an intermediate result having a second number of decimal coefficient digits of precision, wherein the second number of decimal coefficient digits of precision is greater than the first number of decimal coefficient digits of precision;

creating from the intermediate result, a rounded-for-reround DFP number having a third number of decimal coefficient digits of precision and a least significant decimal digit, wherein the third number of decimal coefficient digits of precision is less than or equal to the first number of decimal coefficient digits of precision, wherein based on the least significant decimal digit of the rounded-for-reround DFP number consisting of any one of a 0 and a 5, only the least significant digit being 0 indicates the rounded-for-reround DFP number is exact; and storing in computer processor storage, by the computer processor, the rounded-for-reround number as a final result of the executed DFP operation.

8. The computer system according to claim 7, further comprising b) subsequent to executing the DFP round-for-reround instruction, executing, by the computer processor, a DFP reround instruction, wherein the executing comprises:

rounding, by the computer processor, the rounded-for-reround DFP number to produce a rounded result, wherein the rounded result represents a DFP number having at least 2 fewer decimal coefficient digits of precision than the third number of decimal coefficient digits of precision; and storing in computer processor storage, by the computer processor, the rounded result as a result of the execution of the DFP reround instruction.

9. The computer system according to claim 8, wherein the a) executing, by a computer processor, the DFP round-for-reround instruction further comprises:

fetching from computer processor storage, by the computer processor, the DFP operand comprising a fourth number of coefficient bits representing a first decimal number, wherein the first decimal number has the first number of decimal coefficient digits of precision;

performing, in the round-for-reround mode, by the computer processor, the DFP operation on the DFP operand to form the intermediate result, wherein the intermediate result consists of a high order portion and a to-be-discarded low order portion, wherein the high order portion comprises a fifth number of coefficient bits representing a second decimal number, the second decimal number having a least significant decimal digit, the to-be-discarded low order portion having a sixth number of coefficient bits;

based on the to-be-discarded low order portion representing a greater-than-0 decimal value, causing the least significant decimal digit to not have a 0 value by setting the least significant bit of the high order portion to 1; and wherein the b) executing, by the computer processor, the DFP reround instruction further comprises:

fetching from computer processor storage, by the computer processor, the stored rounded-for-reround number of the executed DFP operation, wherein the fetched rounded-for-reround number comprises the fifth number of bits representing the second number of decimal coefficient digits;

determining a DFP reround instruction specified rounding precision, wherein the second DFP reround specified rounding precision consists of at least 2 fewer decimal coefficient digits than the first number of decimal coefficient digits;

rounding, by the computer processor, the fetched rounded-for-reround number to a rounded result, wherein the rounded result represents a decimal number having the at least 2 fewer decimal coefficient digits of precision than the third number of decimal coefficient digits of precision.

10. The computer system according to claim 8, further comprising:

executing in emulation mode, by the computer processor, one or more of any one of the DFP round-for-reround instruction and the DFP reround instruction using subroutines configured to implement the respective instructions.

11. The computer system according to claim 8, wherein operands of the DFP operation comprises encoded forms of decimal coefficients, wherein decimal coefficients of encoded forms consist of any one of a binary integer decimal (BID) encoding and a densely packed decimal (DPD) encoding.

12. The computer system according to claim 8, wherein the executed DFP operation consists of any one of a Multiply, a fused Multiply-and-Add, a Divide, a Convert to BCD, a Convert from BCD, an Add and a Subtract.

13. A computer program product for rounding a decimal floating point number to a lesser precision in a computer processor, the computer program product comprising a computer readable storage medium having program instructions embodied therewith, wherein the computer readable storage medium is not a transitory signal per se, the program instructions executable by a computer processor to cause the computer processor to perform a method comprising:

a) executing, by the computer processor, a DFP round-for-reround instruction in a round-for-reround mode, wherein the DFP round-for-reround instruction is configured to perform a DFP operation on a DFP operand, wherein the DFP operand comprises a first number of decimal coefficient digits of precision, wherein the executing the DFP round-for-reround instruction comprises:

forming, by the computer processor, an intermediate result having a second number of decimal coefficient digits of precision, wherein the second number of decimal coefficient digits of precision is greater than the first number of decimal coefficient digits of precision;

creating from the intermediate result, a rounded-for-reround DFP number having a third number of decimal coefficient digits of precision and a least significant decimal digit, wherein the third number of decimal coefficient digits of precision is less than or equal to the first number of decimal coefficient digits of precision, wherein based on the least significant decimal digit of the rounded-for-reround DFP number consisting of any one of a 0 and a 5, only the least significant digit being 0 indicates the rounded-for-reround DFP number is exact; and storing in computer processor storage, by the computer processor, the rounded-for-reround number as a final result of the executed DFP operation.

14. The computer program product according to claim 13, further comprising b) subsequent to executing the DFP round-for-reround instruction, executing, by the computer processor, a DFP reround instruction, wherein the executing comprises:

rounding, by the computer processor, the rounded-for-reround DFP number to produce a rounded result, wherein the rounded result represents a DFP number having at least 2 fewer decimal coefficient digits of precision than the third number of decimal coefficient digits of precision; and storing in computer processor storage, by the computer processor, the rounded result as a result of the execution of the DFP reround instruction.

15. The computer program product according to claim 14, wherein the a) executing, by a computer processor, the DFP round-for-reround instruction further comprises:

fetching from computer processor storage, by the computer processor, the DFP operand comprising a fourth number of coefficient bits representing a first decimal number, wherein the first decimal number has the first number of decimal coefficient digits of precision;

performing, in the round-for-reround mode, by the computer processor, the DFP operation on the DFP operand to form the intermediate result, wherein the intermediate result consists of a high order portion and a to-be-discarded low order portion, wherein the high order portion comprises a fifth number of coefficient bits representing a second decimal number, the second decimal number having a least significant decimal digit, the to-be-discarded low order portion having a sixth number of coefficient bits;

based on the to-be-discarded low order portion representing a greater-than-0 decimal value, causing the least significant decimal digit to not have a 0 value by setting the least significant bit of the high order portion to 1; and wherein the b) executing, by the computer processor, the DFP reround instruction further comprises:

fetching from computer processor storage, by the computer processor, the stored rounded-for-reround number of the executed DFP operation, wherein the fetched rounded-for-reround number comprises the fifth number of bits representing the second number of decimal coefficient digits;

determining a DFP reround instruction specified rounding precision, wherein the reround instruction specified rounding precision consists of at least 2 fewer decimal coefficient digits than the first number of decimal coefficient digits;

rounding, by the computer processor, the fetched rounded-for-reround number to a rounded result, wherein the rounded result represents a decimal number having the at least 2 fewer decimal coefficient digits of precision than the third number of decimal coefficient digits of precision.

16. The computer program product according to claim 14, further comprising:

executing in emulation mode, by the computer processor, one or more of any one of the DFP round-for-reround instruction and the DFP reround instruction using subroutines configured to implement the respective instructions.

17. The computer program product according to claim 14, wherein operands of the DFP operation comprises encoded forms of decimal coefficients, wherein decimal coefficients of encoded forms consist of any one of a binary integer decimal (BID) encoding and a densely packed decimal (DPD) encoding.

* * * * *